United States Patent
Huth et al.

(10) Patent No.: US 11,536,246 B2
(45) Date of Patent: Dec. 27, 2022

(54) SPAN-WISE EXTENDING PIN FOR JOINING ROTOR BLADE SEGMENTS

(71) Applicant: General Electric Company, Schenectady, NY (US)

(72) Inventors: Scott Jacob Huth, Greenville, SC (US); Matthew Brian Dudon, Mauldin, SC (US); Jon Stuart Wright, Greenville, SC (US)

(73) Assignee: General Electric Company, Schenectady, NY (US)

( * ) Notice: Subject to any disclaimer, the term of this patent is extended or adjusted under 35 U.S.C. 154(b) by 19 days.

(21) Appl. No.: 17/290,344

(22) PCT Filed: Nov. 1, 2018

(86) PCT No.: PCT/US2018/058718
§ 371 (c)(1),
(2) Date: Apr. 30, 2021

(87) PCT Pub. No.: WO2020/091792
PCT Pub. Date: May 7, 2020

(65) Prior Publication Data
US 2021/0381487 A1 Dec. 9, 2021

(51) Int. Cl.
*F03D 3/06* (2006.01)
*F16B 19/02* (2006.01)
*F03D 13/10* (2016.01)

(52) U.S. Cl.
CPC .............. *F03D 3/062* (2013.01); *F03D 13/10* (2016.05); *F16B 19/02* (2013.01)

(58) Field of Classification Search
CPC ........ F03D 3/062; F03D 3/064; F03D 3/0683; F03D 1/065; F03D 1/0675;
(Continued)

(56) References Cited

U.S. PATENT DOCUMENTS

| 851,196 A | 4/1907 | Bevans et al. |
| 4,474,536 A | 10/1984 | Gougeon et al. |

(Continued)

FOREIGN PATENT DOCUMENTS

| EP | 2186622 A1 | 5/2010 |
| EP | 2957765 A1 | 12/2015 |

(Continued)

OTHER PUBLICATIONS

International Search Report for application No. PCT/US2018/059718, dated Jul. 22, 2019.

*Primary Examiner* — Christopher Verdier
*Assistant Examiner* — Maxime M Adjagbe
(74) *Attorney, Agent, or Firm* — Dority & Manning, P.A.

(57) ABSTRACT

A span-wise extending pin for joining blade segments of a rotor blade includes a distal portion having a length defined by a first end and an opposing, second end. The distal portion has a conical shape extending for at least a portion of the length thereof for providing ease of insertion of the pin into a pin joint slot of one of the first and second blade segments. The pin also includes a pin portion adjacent to the distal portion. The pin portion includes a first section and a second section. The second section is configured for securing within a beam structure of the first blade segment. The first section extends span-wise from a receiving end of the beam structure. The pin also includes a proximal portion having at least a rod member that extends span-wise through and secures together the pin portion and the distal portion.

13 Claims, 14 Drawing Sheets

(58) Field of Classification Search
CPC ............ F05B 2240/302; F05B 2230/60; F05B 2260/30; F05B 2260/301; B23P 19/10; B23P 19/12; F16B 19/02; F16B 7/0413; F16B 2200/50; F16B 2200/506
USPC ....... 403/240, 247, 248, 256, 257, 259, 261, 403/264
See application file for complete search history.

(56) References Cited

U.S. PATENT DOCUMENTS

| | | | |
|---|---|---|---|
| 4,643,646 | A | 2/1987 | Hahn et al. |
| 4,732,542 | A | 3/1988 | Hahn et al. |
| 5,281,454 | A | 1/1994 | Hanson |
| 7,334,989 | B2 | 2/2008 | Arelt |
| 7,344,360 | B2 | 3/2008 | Wetzel |
| 7,901,188 | B2 | 3/2011 | Llorente Gonzalez et al. |
| 7,922,454 | B1 | 4/2011 | Riddell |
| 7,927,077 | B2 | 4/2011 | Olson |
| 7,997,874 | B2 | 8/2011 | vander Bos |
| 7,998,303 | B2 | 8/2011 | Baehmann et al. |
| 8,123,488 | B2 | 2/2012 | Finnigan et al. |
| 8,297,932 | B2 | 10/2012 | Arocena De La Rua et al. |
| 8,348,622 | B2 | 1/2013 | Bech |
| 8,356,982 | B2 | 1/2013 | Petri Larrea et al. |
| 8,376,713 | B2 | 2/2013 | Kawasetsu et al. |
| 8,388,316 | B2 | 3/2013 | Arocena De La Rua et al. |
| 8,517,689 | B2 | 8/2013 | Kyriakides et al. |
| 8,556,591 | B2* | 10/2013 | Koronkiewicz ........ F03D 80/00 416/244 R |
| 8,919,754 | B2 | 12/2014 | Schibsbye |
| 9,669,589 | B2 | 6/2017 | Zamora Rodriguez et al. |
| 2007/0018049 | A1 | 1/2007 | Stuhr |
| 2007/0253824 | A1 | 11/2007 | Eyb |
| 2009/0116962 | A1 | 5/2009 | Pedersen et al. |
| 2009/0155084 | A1 | 6/2009 | Livingston et al. |
| 2009/0162208 | A1 | 6/2009 | Zirin et al. |
| 2010/0132884 | A1 | 6/2010 | Baehmann et al. |
| 2010/0215494 | A1 | 8/2010 | Bech et al. |
| 2010/0304170 | A1 | 12/2010 | Frederiksen |
| 2011/0052403 | A1 | 3/2011 | Kawasetsu et al. |
| 2011/0081247 | A1 | 4/2011 | Hibbard |
| 2011/0081248 | A1 | 4/2011 | Hibbard |
| 2011/0091326 | A1* | 4/2011 | Hancock ................ F03D 1/0683 29/889.7 |
| 2011/0158788 | A1 | 6/2011 | Bech et al. |
| 2011/0158806 | A1 | 6/2011 | Arms et al. |
| 2011/0229336 | A1 | 9/2011 | Richter et al. |
| 2012/0023864 | A1* | 2/2012 | Zheng .................... E04H 12/10 411/337 |
| 2012/0093627 | A1 | 4/2012 | Christenson et al. |
| 2012/0196079 | A1 | 8/2012 | Brauers et al. |
| 2012/0213642 | A1 | 8/2012 | Wang et al. |
| 2012/0269643 | A1 | 10/2012 | Hibbard et al. |
| 2012/0308396 | A1 | 12/2012 | Hibbard |
| 2013/0040151 | A1 | 2/2013 | Jeromerajan et al. |
| 2013/0064663 | A1 | 3/2013 | Loth et al. |
| 2013/0129518 | A1 | 5/2013 | Hayden et al. |
| 2013/0164133 | A1 | 7/2013 | Grove-Nielsen |
| 2013/0177433 | A1 | 7/2013 | Fritz et al. |
| 2013/0189112 | A1 | 7/2013 | Hedges et al. |
| 2013/0189114 | A1 | 7/2013 | Jenzewski et al. |
| 2013/0219718 | A1 | 8/2013 | Busbey et al. |
| 2013/0224032 | A1 | 8/2013 | Busbey et al. |
| 2013/0236307 | A1 | 9/2013 | Stege |
| 2013/0236321 | A1 | 9/2013 | Olthoff |
| 2014/0286780 | A1 | 9/2014 | Lemos et al. |
| 2015/0204200 | A1 | 7/2015 | Eyb et al. |
| 2015/0369211 | A1* | 12/2015 | Merzhaeuser .......... F03D 80/30 416/61 |
| 2019/0277248 | A1 | 9/2019 | Herrig et al. |

FOREIGN PATENT DOCUMENTS

| | | |
|---|---|---|
| EP | 3144526 A1 | 3/2017 |
| FR | 2710871 A1 | 4/1995 |
| GB | 2477847 A | 8/2011 |
| WO | WO2009/034291 A2 | 3/2009 |
| WO | WO2009/077192 A2 | 6/2009 |
| WO | WO2010/023299 A2 | 3/2010 |
| WO | WO2011/064553 A2 | 6/2011 |
| WO | WO2011/066279 A2 | 6/2011 |
| WO | WO2015/051803 A1 | 4/2015 |
| WO | WO2015/185066 A1 | 12/2015 |
| WO | WO2018/031024 A1 | 2/2018 |

* cited by examiner

SPAN-WISE EXTENDING PIN FOR JOINING ROTOR BLADE SEGMENTS

FIELD

The present disclosure relates generally to wind turbines, and more particularly to a span-wise extending pin for joining rotor blade segments of a rotor blade of a wind turbine.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and a rotor having a rotatable hub with one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The rotor blades generally include a suction side shell and a pressure side shell typically formed using molding processes that are bonded together at bond lines along the leading and trailing edges of the blade. Further, the pressure and suction shells are relatively lightweight and have structural properties (e.g., stiffness, buckling resistance and strength) which are not configured to withstand the bending moments and other loads exerted on the rotor blade during operation. Thus, to increase the stiffness, buckling resistance and strength of the rotor blade, the body shell is typically reinforced using one or more structural components (e.g. opposing spar caps with a shear web configured therebetween) that engage the inner pressure and suction side surfaces of the shell halves. The spar caps and/or shear web may be constructed of various materials, including but not limited to glass fiber laminate composites and/or carbon fiber laminate composites.

As wind turbines continue to increase in size, the rotor blades also increase in size. Thus, larger rotor blades may be constructed in segments that can be assembled on site via one or more pin joints. Increasing the blade length requires additional blade support, because gravity pulls along the increased length to create a larger bending moment than in shorter rotor blades. As such, certain jointed rotor blades may include a first blade segment having a beam structure that is received within a receiving section of a second blade segment that is further secured together via one or more span-wise and/or chord-wise extending pins that transfer the blade bending moment from one segment to the other. Thus, the pin joints are configured to allow the blade tip to flex to withstand some of this load.

Accordingly, the art is continually seeking improved jointed rotor blades for wind turbines that address the aforementioned issues. As such, the present disclosure is directed to an improved span-wise extending pin for joining rotor blade segments of a rotor blade of a wind turbine.

BRIEF DESCRIPTION

Aspects and advantages of the invention will be set forth in part in the following description, or may be obvious from the description, or may be learned through practice of the invention.

In one aspect, the present disclosure is directed to a rotor blade for a wind turbine. The rotor blade includes a first blade segment and a second blade segment extending in opposite directions from a chord-wise joint. Each of the first and second blade segments includes at least one shell member defining an airfoil surface. The first blade segment includes a beam structure having a receiving end. The second blade segment includes a receiving section that receives the beam structure of the first blade segment. Further, the receiving section includes a chord-wise member having a pin joint slot defined therethrough. The rotor blade also includes at least one span-wise extending pin extending from the receiving end of the beam structure and into the pin joint slot so as to secure the first and second blade segments together. The span-wise extending pin includes a distal portion having a length defined by a first end and an opposing, second end. The distal portion has a conical shape extending for at least a portion of the length thereof for providing ease of insertion of the span-wise extending pin into the pin joint slot. The pin also includes a pin portion adjacent to the distal portion. The pin portion has a first section and a second section. The second section is secured within the beam structure. The first section extends span-wise from the receiving end of the beam structure. Moreover, the pin includes a proximal portion having a rod member that extends span-wise through and secures together the pin portion and the distal portion.

In one embodiment, the distal portion may further include at least one through hole for providing improved torqueing capability. In addition, the conical shape may extend the length of the distal portion from the first end to the second end. Alternatively, the conical shape may extend from the first end to an intermediate location of the distal portion before the second end. In such embodiments, the distal portion may include an extended, uniform body section adjacent to the conical shape.

In another embodiment, the span-wise extending pin may include a radial flange positioned between the first and second sections of the pin portion so as to provide further radial retention of the span-wise extending pin within the beam structure. In such embodiments, the radial flange abuts against the receiving end of the beam structure.

In further embodiments, the first section of the pin portion may have a first diameter and the second section may have a larger, second diameter. In another embodiment, the pin portion may include a protruding feature at a distal end thereof for receiving the distal portion thereon. In additional embodiments, the pin portion may include an internal tapered opening at a distal end or a proximal end thereof for receiving the rod member. In several embodiments, at least a portion of an internal wall of the first section and/or second section of the pin portion may be hollowed out.

In particular embodiments, the proximal portion may also include a flange member secured within the beam structure of the first blade segment adjacent to the second section of the pin portion via the rod member. In such embodiments, the rod member may be threaded and secured within the pin portion and the distal portion via one or more fasteners. In further embodiments, the flange member may be sized to fit through the pin joint slot. In addition, the flange member may include one or more cut-outs for providing improved torqueing capability of the rod member.

In certain embodiments, the rotor blade may further include a retention assembly for the span-wise extending pin within the pin joint slot. For example, the retention assembly may include a bearing assembly, a bushing assembly, a threaded connection, an adhesive, a press-fit, or any other suitable retention feature. In another example, for example, the bearing assembly may include a bearing and a bearing retention housing. In such embodiments, the span-wise extending pin may be received with the bearing assembly or the bushing.

In another aspect, the present disclosure is directed to a pin for joining first and second blade segments of a rotor blade of a wind turbine. The pin includes a distal portion having a length defined by a first end and an opposing, second end. The distal portion has a conical shape extending for at least a portion of the length thereof for providing ease of insertion of the pin into a pin joint slot of one of the first and second blade segments. The pin also includes a pin portion adjacent to the distal portion. The pin portion includes a first section and a second section. The second section is configured for securing within a beam structure of the first blade segment. The first section extends span-wise from a receiving end of the beam structure. The pin also includes a proximal portion having at least a rod member that extends span-wise through and secures together the pin portion and the distal portion. It should be understood that the pin may further include any of the additional features as described herein.

In yet another aspect, the present disclosure is directed to a method of joining first and second blade segments of a rotor blade of a wind turbine. The method includes providing the first blade segment having a beam structure that extends in a generally span-wise direction and includes a receiving end. The method also includes providing a first pin joint slot in the receiving end of the beam structure. Further, the method includes inserting a proximal portion of a pin through the first pin joint slot and into the beam structure. The proximal portion has a rod member secured to a flange member. Moreover, the method includes inserting a pin portion of the pin at least partially through the first pin joint slot until a first section of the pin portion extends from the receiving end and a second section of the pin portion is positioned in a wall of the beam structure. In addition, the method includes blindly feeding the rod member of the proximal portion through the pin portion from within the beam structure until the flange member abuts against the second section of the pin portion. Further, the method includes securing the rod member within the pin portion. The method also includes installing a distal portion to a distal surface of first section of the pin portion. The distal portion includes a length defined by a first end and an opposing, second end. The distal portion includes a conical shape for at least a portion of the length thereof. Moreover, the method includes providing the second blade segment having a receiving section that extends in the generally span-wise direction. The receiving section has a chord-wise member with a second pin joint slot defined therethrough. In addition, the method includes inserting the beam structure of the first blade segment into the receiving section of the second blade segment. As such, the second pin joint slot first receives the distal portion of the span-wise extending pin of the beam structure so as to allow blind assembly of the first and second blade segments together at a chord-wise joint. It should be understood that the method may further include any of the additional features and/or steps as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
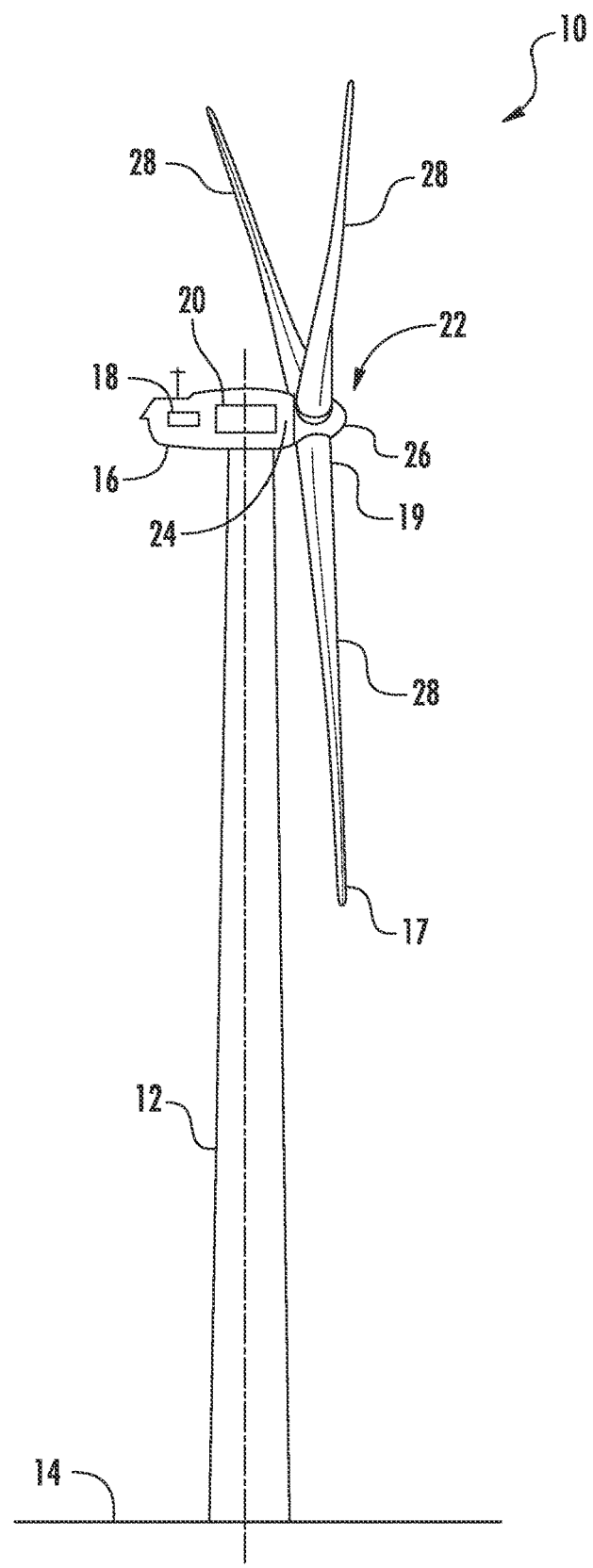
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a perspective view of one embodiment of a wind turbine 10 according to the present invention. In the illustrated embodiment, the wind turbine 10 is a horizontal-axis wind turbine. Alternatively, the wind turbine 10 may be a vertical-axis wind turbine. In addition, as shown, the wind turbine 10 may include a tower 12 that extends from a support surface 14, a nacelle 16 mounted on the tower 12, a generator 18 positioned within the nacelle 16, a gearbox 20 coupled to the generator 18, and a rotor 22 that is rotationally coupled to the gearbox 20 with a rotor shaft 24. Further, as shown, the rotor 22 includes a rotatable hub 26 and at least one rotor blade 28 coupled to and extending outward from the rotatable hub 26. As shown, the rotor blade 28 includes a blade tip 17 and a blade root 19.

Figure 2:
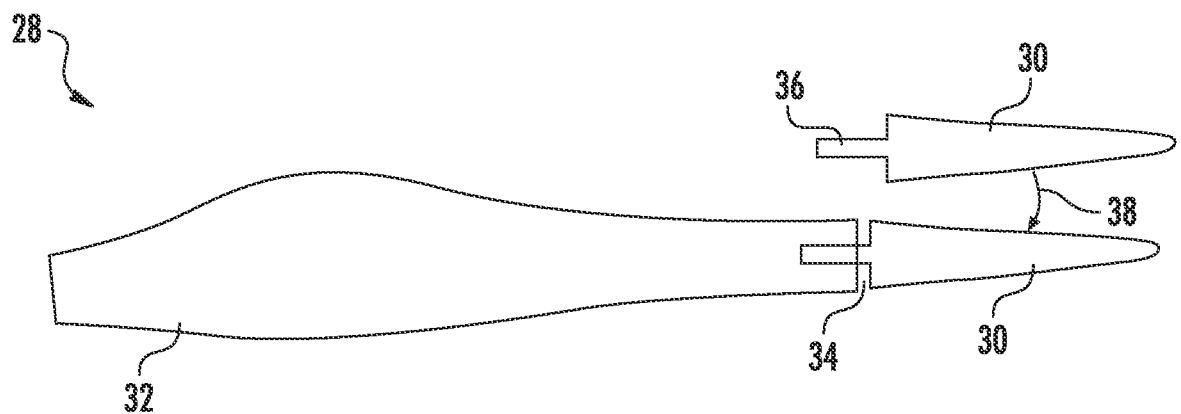
FIG. 2 illustrates a plan view of one embodiment of a rotor blade having a first blade segment and a second blade segment according to the present disclosure.

Referring now to FIG. 2, a plan view of one of the rotor blades 28 of FIG. 1 is illustrated. As shown, the rotor blade 28 may include a first blade segment 30 and a second blade segment 32. Further, as shown, the first blade segment 30 and the second blade segment 32 may each extend in opposite directions from a chord-wise joint 34. In addition, as shown, each of the blade segments 30, 32 may include at least one shell member defining an airfoil surface, such as a pressure side shell member and a suction side shell member. The first blade segment 30 and the second blade segment 32 are connected by at least an internal support structure 36 extending into both blade segments 30, 32 to facilitate joining of the blade segments 30, 32. The arrow 38 shows that the segmented rotor blade 28 in the illustrated example includes two blade segments 30, 32 and that these blade segments 30, 32 are joined by inserting the internal support structure 36 into the second blade segment 32. In addition, as shown, the second blade segment includes multiple spar structures 66 (also referred to herein as spar caps) that extend lengthwise for connecting with the beam structure 40 of the first blade segment 30 (which is shown in more detail in FIGS. 3 and 5).

Figure 3:
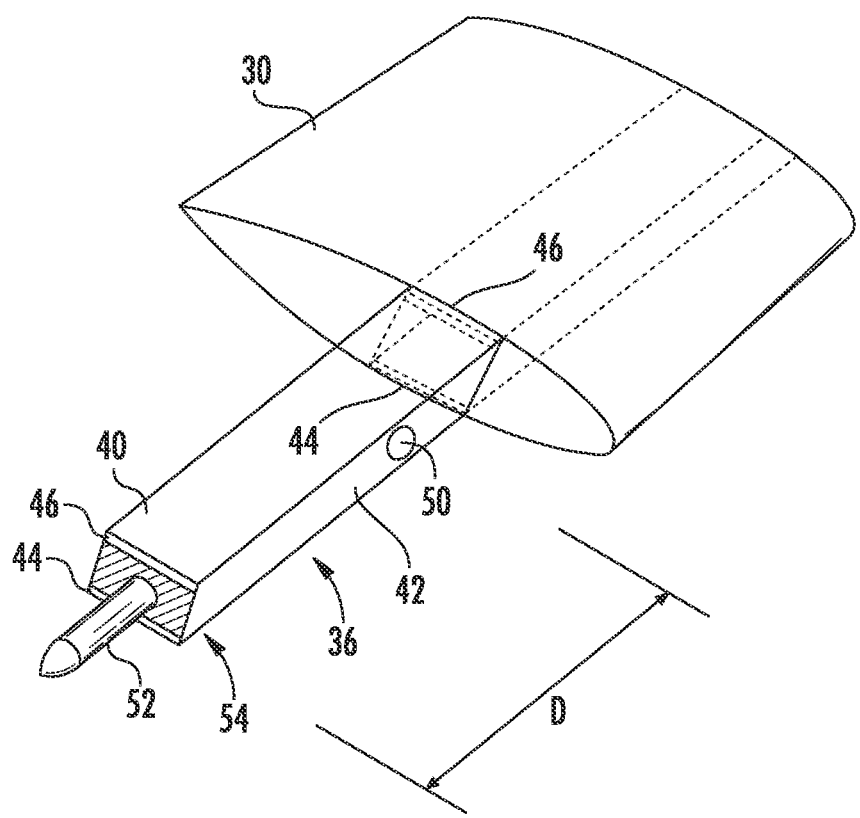
FIG. 3 illustrates a perspective view of a section of one embodiment of the first blade segment according to the present disclosure.

Referring now to FIG. 3, a perspective view of a section of the first blade segment 30 according to the present disclosure is illustrated. As shown, the first blade segment 30 includes a beam structure 40 that forms a portion of the internal support structure 36 and extends lengthwise for structurally connecting with the second blade segment 32. Further, as shown, the beam structure 40 forms at least a part of a shear web 42 connected with a suction side spar cap 44 and a pressure side spar cap 46. Moreover, as shown, the first blade segment 30 may include one or more first pin joints at a receiving end 54 of the beam structure 40. In one embodiment, the pin joint may include a pin that is in a tight interference fit with a bushing. More specifically, as shown, the pin joint(s) may include at least one pin tube 52 located on the receiving end 54 of the beam structure 40. Thus, as shown, the pin tube 52 may be oriented in a span-wise direction. Further, the first blade segment 30 may also include a pin joint slot 50 located on the beam structure 40. Moreover, as shown, the pin joint slot 50 may be oriented in a chord-wise direction.

Figure 4:
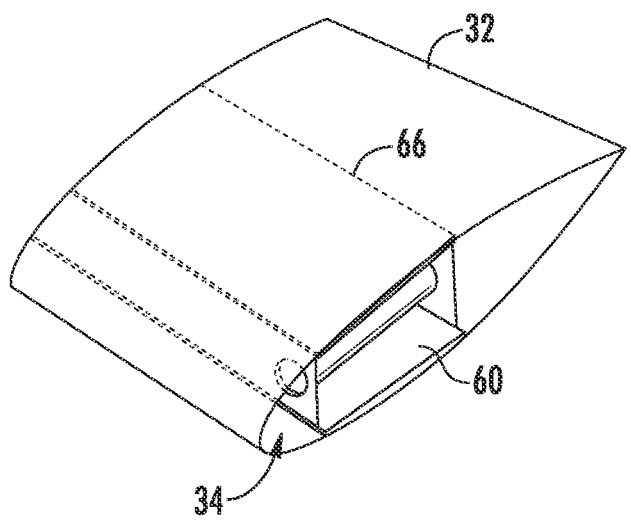
FIG. 4 illustrates a perspective view of one embodiment of a section of the second blade segment at the chord-wise joint according to the present disclosure.

Referring now to FIG. 4, a perspective view of a section of the second blade segment 32 according to the present disclosure is illustrated. As shown, the second blade segment 32 includes a receiving section 60 extending lengthwise within the second blade segment 32 for receiving the beam structure 40 of the first blade segment 30. Further, as shown, the receiving section 60 may include the spar structures 66 that extend lengthwise for connecting with the beam structure 40 of the first blade segment 30. In addition, as shown, the receiving section 60 may include a chord-wise member 48 having a span-wise pin joint slot 56 defined therethrough. Moreover, as shown, the receiving section 60 may include a chord-wise pin joint slot 58 defined therethrough that aligns with the pin joint slot 50 of the beam structure 40.

Figure 5:
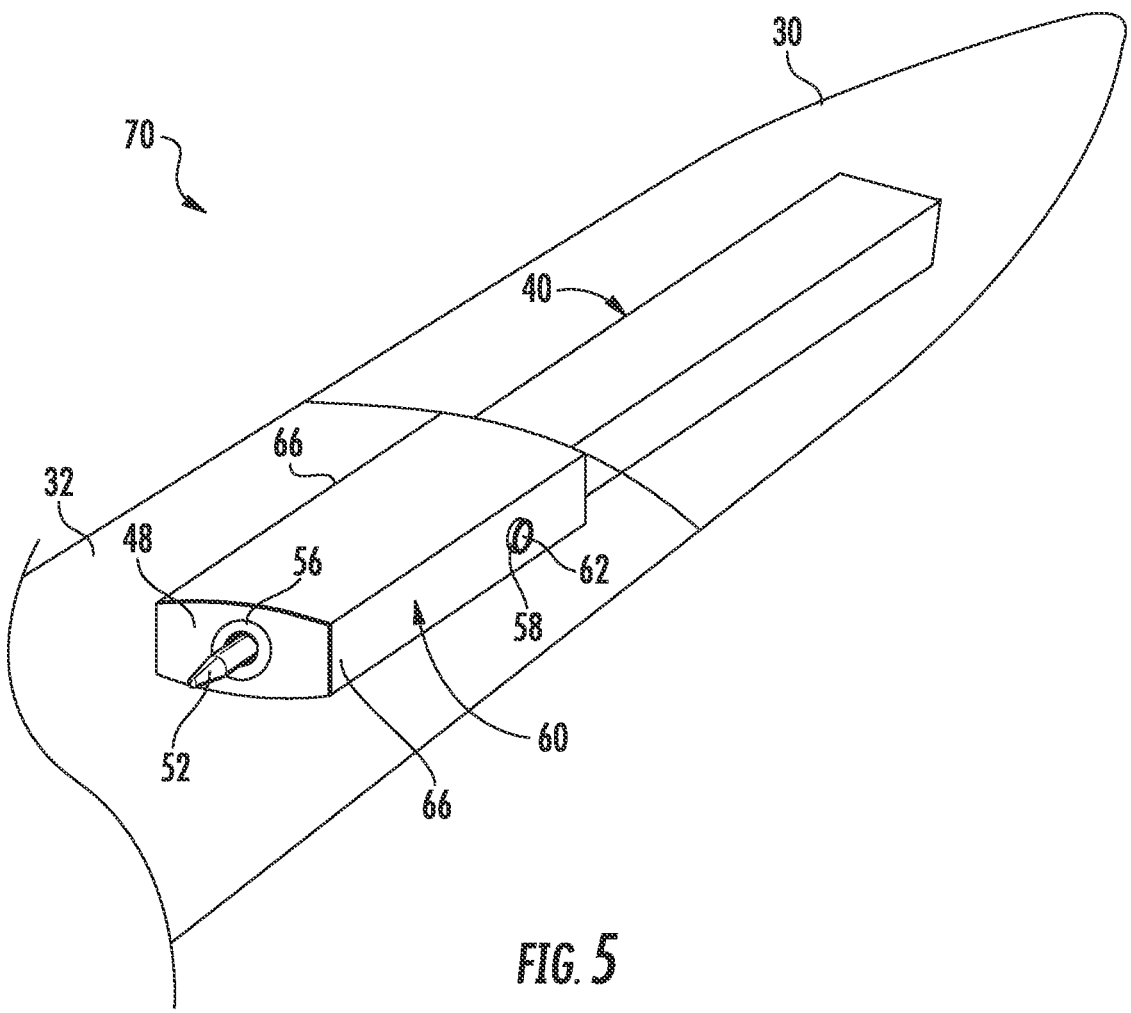
FIG. 5 illustrates an assembly of one embodiment of the rotor blade of the wind turbine having the first blade segment joined with the second blade segment according to the present disclosure.

Referring now to FIG. 5, an assembly 70 of the rotor blade 28 having the first blade segment 30 joined with the second blade segment 32 according to the present disclosure is illustrated. As shown, the assembly 70 illustrates multiple supporting structures beneath outer shell members of the rotor blade 28 having the first blade segment 30 joined with the second blade segment 32. More specifically, as shown, the span-wise extending pin 52 of the receiving end 54 of the beam structure 40 is received within the span-wise pin joint slot 56 of the receiving section 60 so as to secure the first and second blade segments 30, 32 together.

Figure 6:
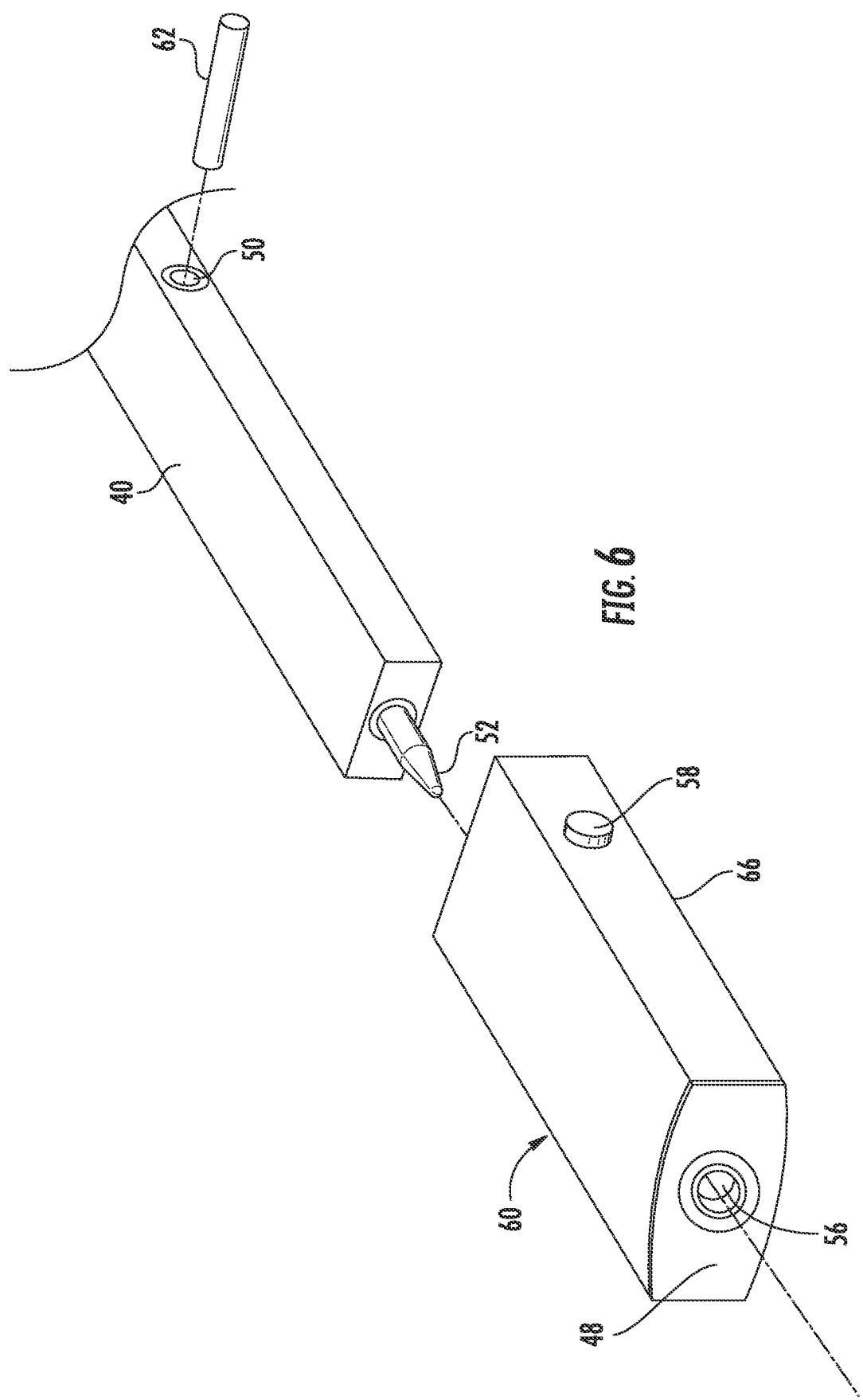
FIG. 6 illustrates an exploded perspective view of one embodiment of the multiple supporting structures of the assembly of the rotor blade of the wind turbine according to the present disclosure.

Referring now to FIG. 6, an exploded perspective view of the multiple supporting structures of the assembly 70 towards the receiving section 60 of the rotor blade 28 is illustrated. As shown, the spar structures 66 are configured to receive the beam structure 40 and may include the chord-wise pin joint slot 58 that align with the pin joint slot 50 of the beam structure 40 through which a chord-wise extending pin 62 may be inserted. Further, as shown, the chord-wise extending 62 may be configured to remain in a tight interference fit within the aligning pin joint slots 50, 58 such that spar structures 66 and the beam structure 40 are joined together during assembly. Further, FIG. 6 also illustrates the chord-wise member 48 that includes the pin joint slot 56 configured for receiving the pin tube 52 (also referred to herein as the span-wise extending pin 52) of the beam structure 40. As such, the pin tube 52 is configured to form a tight interference fit pined joint.

Figure 7:
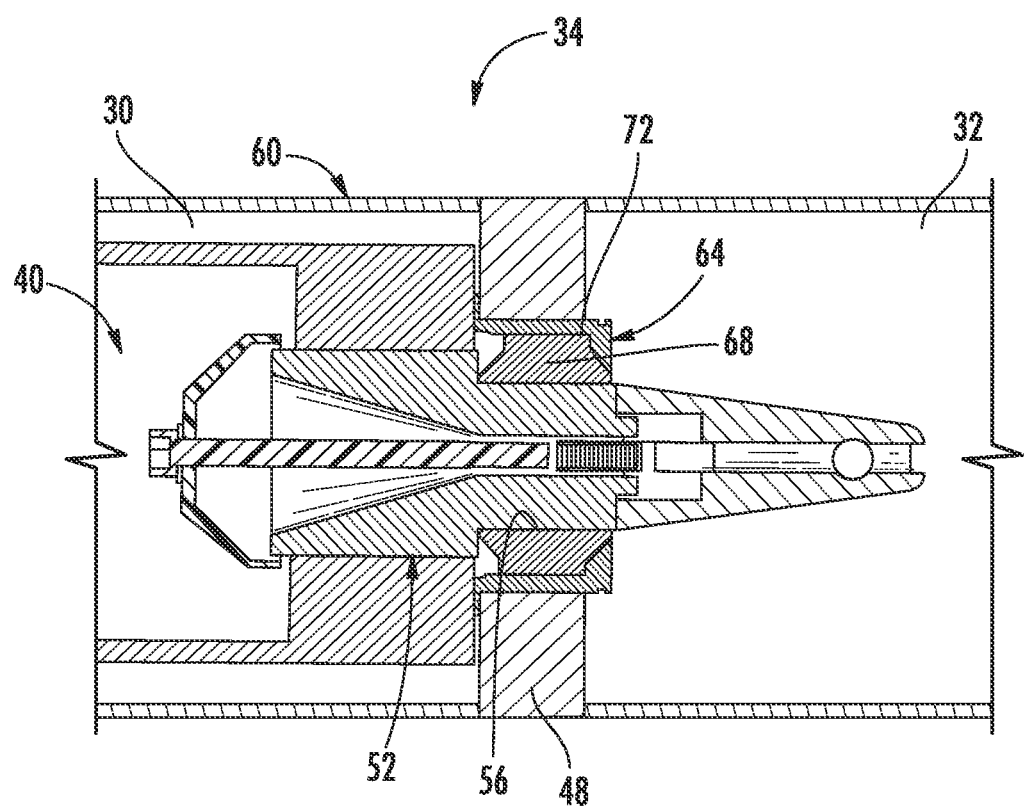
FIG. 7 illustrates a cross-sectional view of one embodiment of the chord-wise joint 34 according to the present disclosure.
Figure 8:
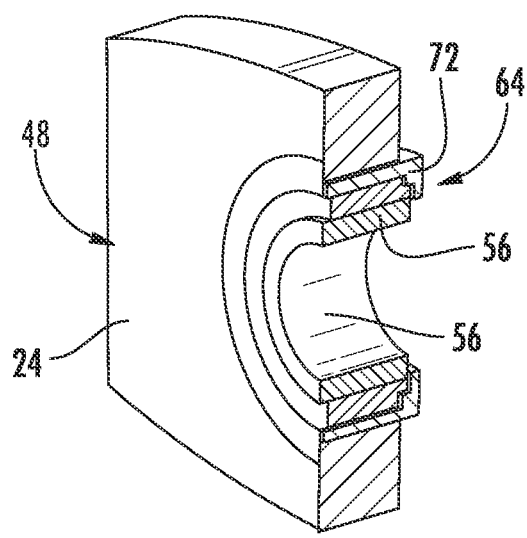
FIG. 8 illustrates a perspective, cross-sectional view of one embodiment of the chord-wise member according to the present disclosure.
Figure 9:
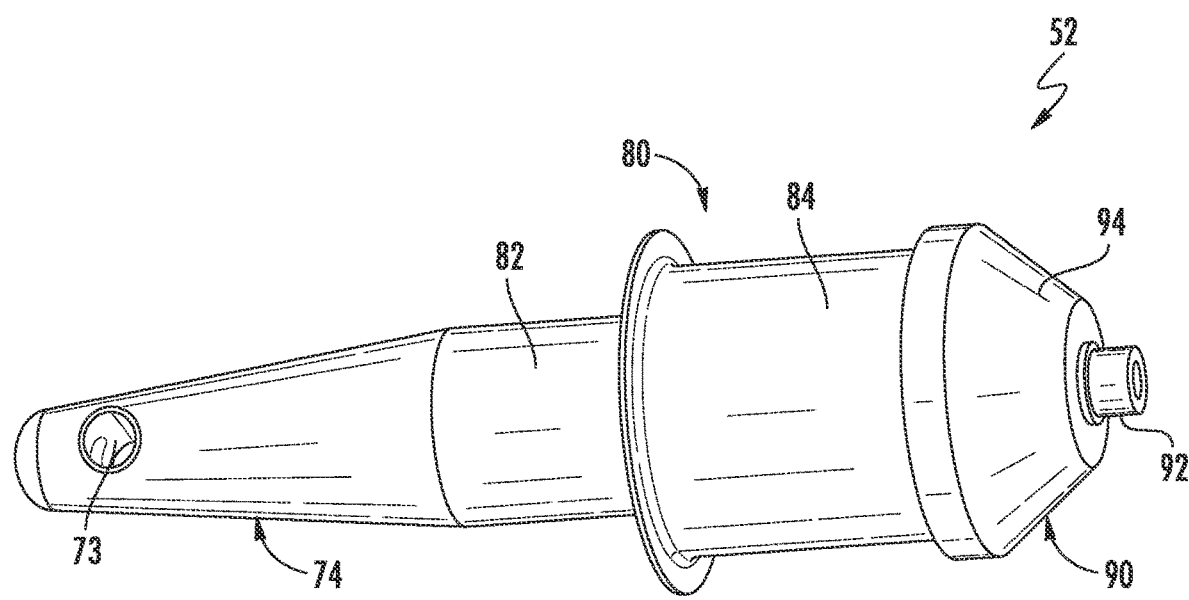
FIG. 9 illustrates a perspective view of one embodiment of the span-wise extending pin according to the present disclosure.

Referring now to FIG. 7, a detailed, cross-sectional view of the chord-wise joint 34 according to the present disclosure is illustrated. As shown, the span-wise extending pin 52 that extends from the beam structure 40 of the first blade segment is received within the receiving section 60 of the second blade segment 32 through the chord-wise member 48. In addition, as shown in FIGS. 7 and 8, the chord-wise member 48 may include the span-wise pin joint slot 56. More specifically, as shown, the chord-wise member 48 may include a bearing assembly 64 received within the pin joint slot 56. It should be understood that the chord-wise member 48 may also include a bushing assembly and/or other compliant structure in addition to or in the alternative of the bearing assembly 64. Further, as shown, the bearing assembly 64 may include a bearing 68 received within a bearing retention housing 72. In embodiments with a bushing assembly, the bushing assembly may similarly include a bushing received within a bushing retention housing. As such, the span-wise extending pin 62 may be received within the bearing 68 of the bearing assembly 64. In additional embodiments, the bearing 68 may include a spherical bearing. Alternatively, the span-wise extending pin 62 may be received within a bushing (not shown).

Figure 10:
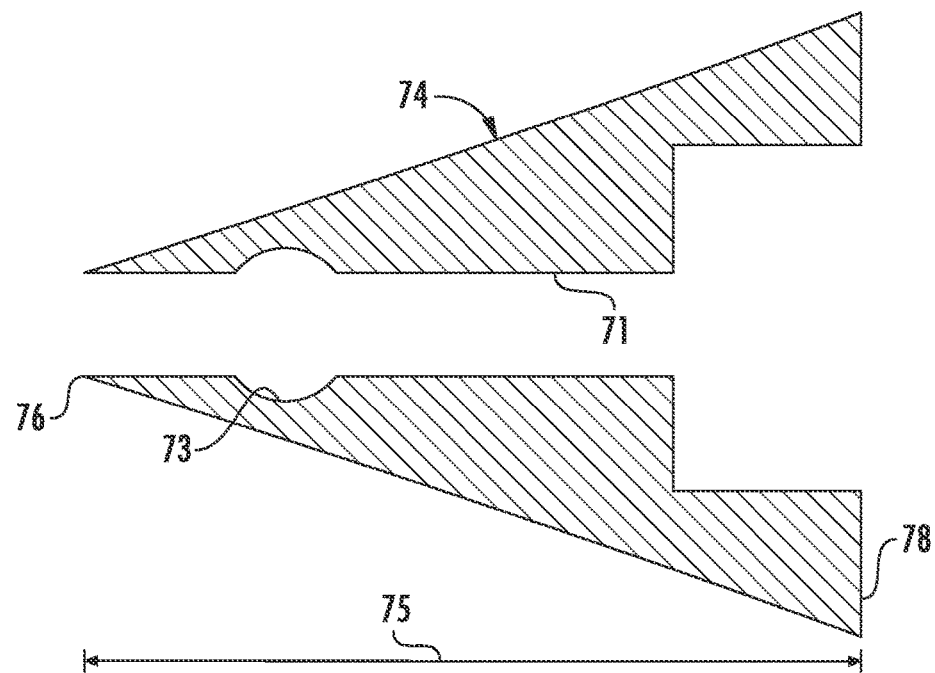
FIG. 10 illustrates a cross-sectional view of one embodiment of a distal portion of the span-wise extending pin according to the present disclosure.
Figure 11:
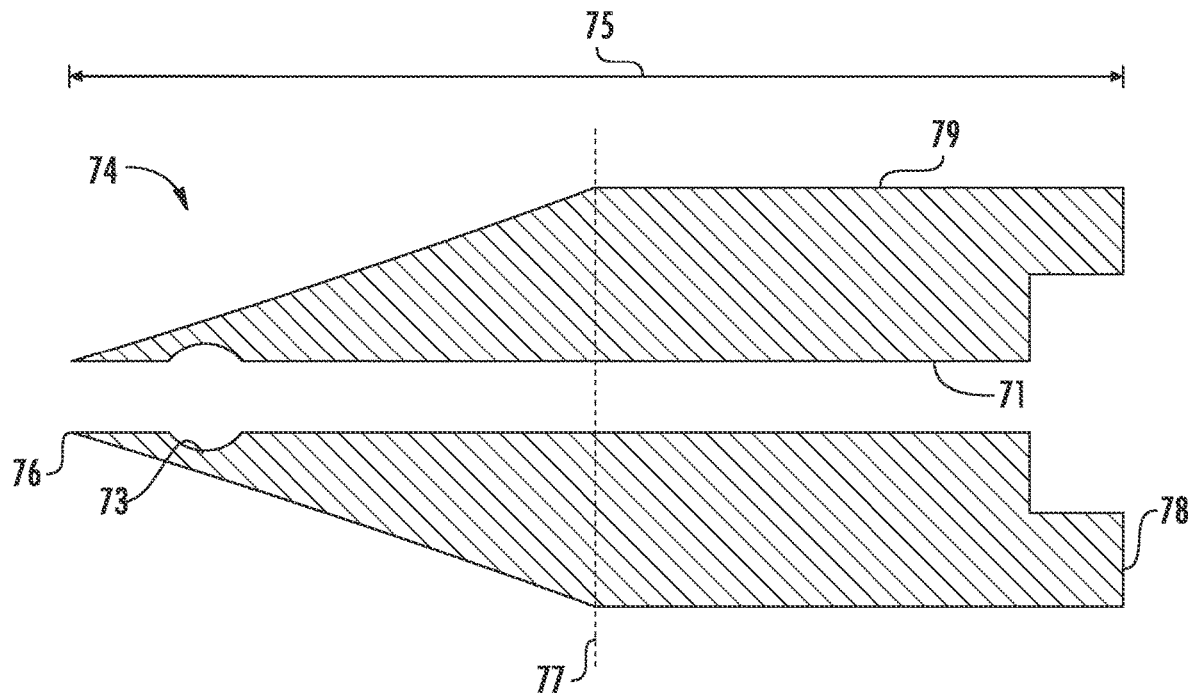
FIG. 11 illustrates a cross-sectional view of another embodiment of a distal portion of the span-wise extending pin according to the present disclosure.

Referring to FIGS. 9-17, multiple views of various embodiments of the components of the span-wise extending pin 52 of the rotor blade 28 are illustrated. As shown generally, the span-wise extending pin 52 may include a distal portion 74, a pin portion 80 adjacent to the distal portion 74, and a proximal portion 90 adjacent to the pin portion 80. Further as shown in FIGS. 7 and 9-11, the distal portion 74 has a length 75 defined by a first end 76 and an opposing, second end 78. Moreover, as shown, the distal portion 74 has a conical shape extending for at least a portion of the length 75 thereof for providing ease of insertion of the span-wise extending pin 52 into the pin joint slot 56. For example, the conical shape may provide a lead-in angle to assist with blind assembly misalignment of the pin into the slot 56, which is described in more detail below. More specifically, as shown in FIG. 10, the conical shape of the distal portion 74 may extend the entire length 75 thereof, i.e. from the first end 76 to the second end 78. In alternative embodiments, the conical shape may extend from the first end 76 to an intermediate location 77 of the distal portion 74, e.g. before the second end 78. In such embodiments, the distal portion 74 may include an extended, uniform body section 79 adjacent to the conical shape. In such embodiments, the extended body 79 is configured to reduce the length of the tapered portion, while maintaining extension for staged assembly. In addition, as shown, the distal portion 74 may further include at least one through hole 73 for providing improved torqueing capability. Moreover, as shown, the distal portion 74 may also include a threaded bore 71 that can be used to secure the distal portion to the pin portion 80, which is described in more detail below.

Referring to FIGS. 7, 9, and 12-15, various embodiments of the pin portion 80 are illustrated according to the present disclosure. As shown, the pin portion 80 has a first section 82 and a second section 84. As shown particularly in FIG. 7, the second section 84 of the pin portion 80 is secured within a wall of the beam structure 40. Further, as shown, the first section 82 extends span-wise from the receiving end 54 of the beam structure 40. In addition, as shown in FIGS. 12-15, the first section 82 of the pin portion 80 may have a first diameter $D^1$, whereas the second section 84 may have a larger, second diameter $D_2$.

Figure 12:
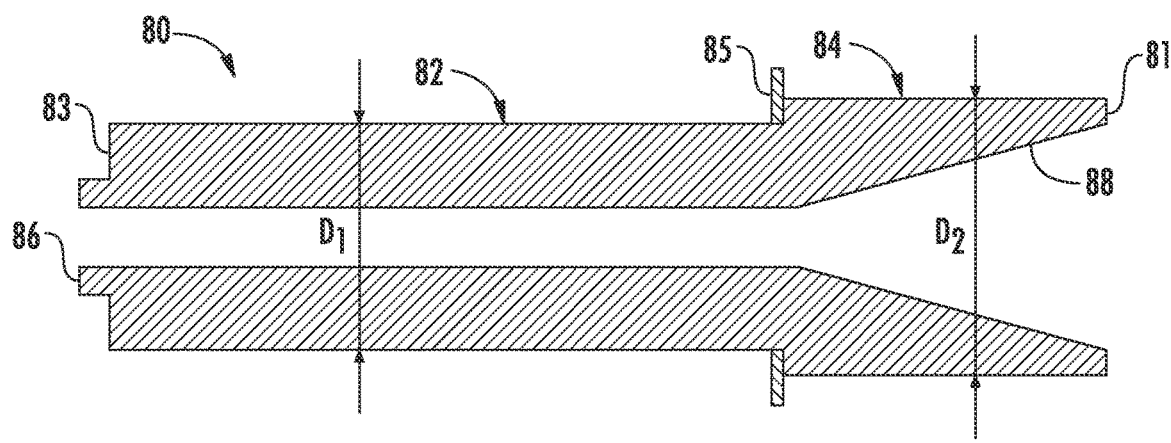
FIG. 12 illustrates a cross-sectional view of one embodiment of a pin portion of the span-wise extending pin according to the present disclosure.

In further embodiments, as shown particularly in FIG. 12, the pin portion 80 may also include a radial flange 85 positioned between the first and second sections 82, 84 so as to provide further radial retention of the span-wise extending pin 52 within the beam structure 40. In such embodiments, as shown, the radial flange 85 is configured to abut against the receiving end 54 of the beam structure 40. In certain embodiments, the radial flange 85 may be welded between the first and second sections 82, 84 of the pin portion 80, formed integrally with the first and second sections 82, 84 of the pin portion 80, or separately attached the radial flange between the first and second sections 82, 84 of the pin portion 80, e.g. as a c-clip or in sections.

Figure 13:
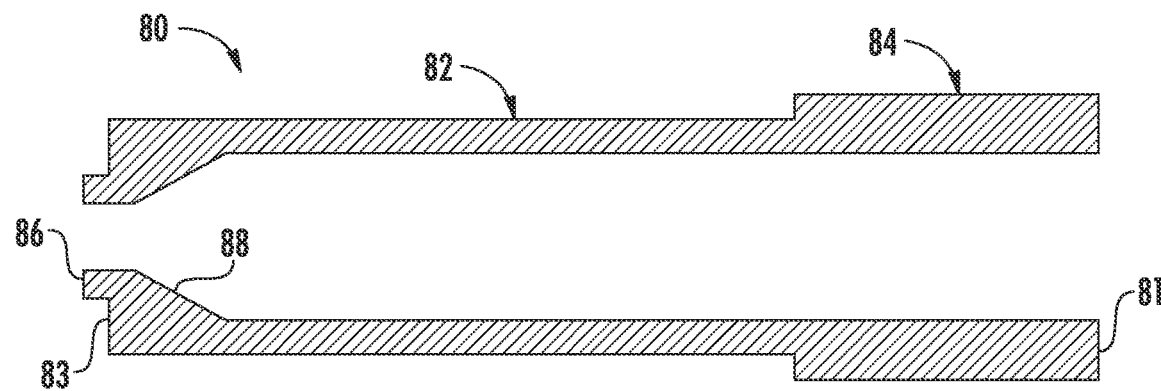
FIG. 13 illustrates a cross-sectional view of another embodiment of a pin portion of the span-wise extending pin according to the present disclosure.
Figure 14:
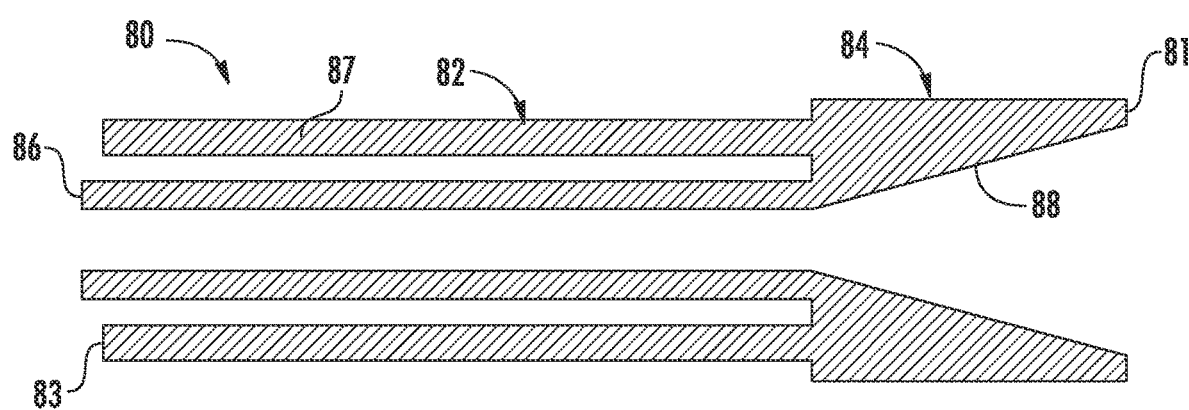
FIG. 14 illustrates a cross-sectional view of yet another embodiment of a pin portion of the span-wise extending pin according to the present disclosure.

In another embodiment, as shown in FIGS. 12-14, the pin portion 80 may include a protruding feature 86 or boss at a distal end thereof for receiving the distal portion 74 thereon. In additional embodiments, as shown in FIGS. 12-14, the pin portion 80 may include an internal tapered opening 88 at a distal end 83 or a proximal end 81 thereof, e.g. for receiving the rod member 92 described herein. More specifically, as shown in FIGS. 12 and 14, the internal tapered opening 88 is located at proximal end 81 of the pin portion 80. Alternatively, as shown in FIG. 13, the internal tapered opening 88 is located at the distal end 83 of the pin portion 80. In addition, as shown in FIG. 14, at least a portion of an internal wall 87 of the first section 82 and/or second section 84 of the pin portion 80 may be hollowed out.

Figure 15:
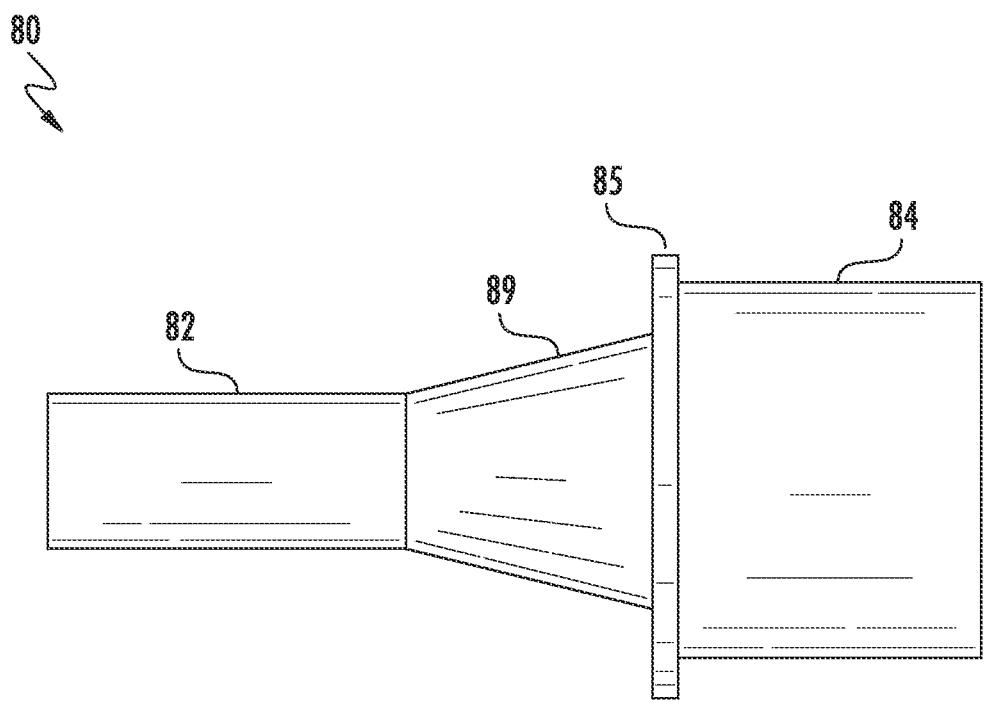
FIG. 15 illustrates a side view of another embodiment of a pin portion of the span-wise extending pin according to the present disclosure.

In addition, as shown in FIG. 15, the pin portion 80 may also include a transitional region 89 between the first and second sections 82, 84. More specifically, as shown the transitional region 89 may be tapered or filleted. In such embodiments, the bending moment is generally at a maximum at the interface of the flange 85 and the second section 84 and a minimum at the interface of the transitional region 89 and the first section 82. Therefore, a smaller diameter spherical bearing may be used with the first section 82 than would otherwise be allowed with a two-section pin portion.

Figure 16:
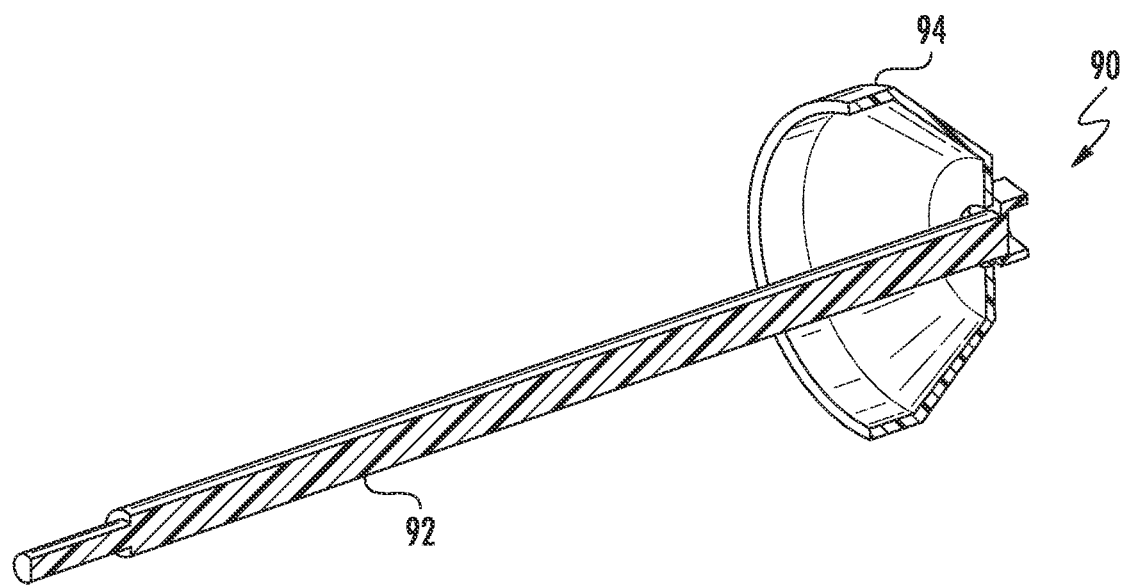
FIG. 16 illustrates a cross-sectional view of one embodiment of a proximal portion of the span-wise extending pin according to the present disclosure.
Figure 17:
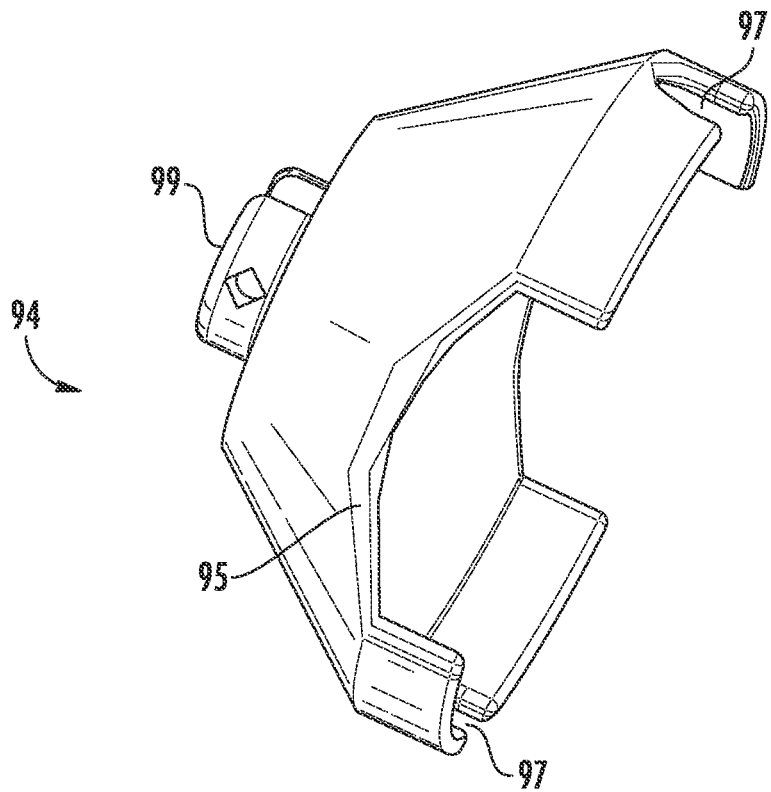
FIG. 17 illustrates a cross-sectional view of one embodiment of a flange member of a proximal portion of the span-wise extending pin according to the present disclosure.
Figure 18:
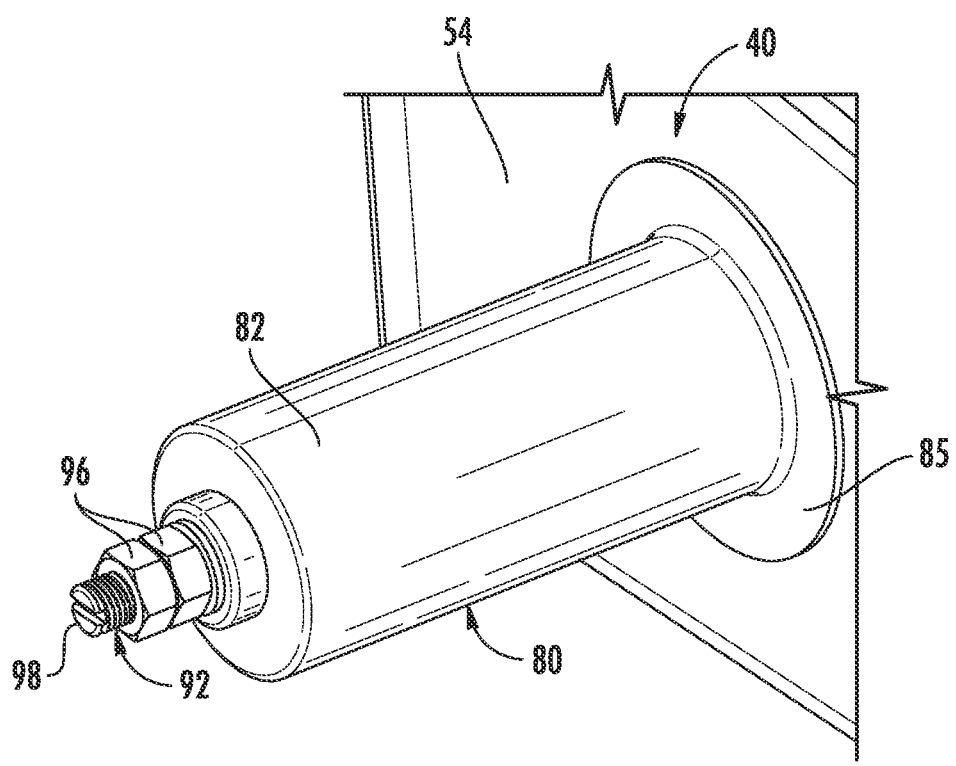
FIG. 18 illustrates a perspective view of one embodiment of a span-wise extending pin received with a beam structure of a first blade segment according to the present disclosure.

Referring to FIGS. 7, 9, and 16-19, various embodiments of the proximal portion 90 are illustrated according to the present disclosure. As shown particularly in FIG. 7, the proximal portion 90 has a rod member 92 that extends span-wise through and secures together the pin portion 80 and the distal portion 74. In such embodiments, as shown in FIGS. 7 and 18, the rod member 92 may be threaded and secured within the pin portion 80 and the distal portion 74 via one or more fasteners 96 (e.g. nuts). In addition, as shown in FIG. 18, the threaded rod member 92 may include an anti-rotation tab 98 to allow tightening of the nuts 96 onto the pin 52. In addition, as shown in FIGS. 15, 16, and 18, the proximal portion 90 may also include a flange member 94 secured to the rod member 92, e.g. through a threaded bore 99. As such, the rod member 92 may extending through the flange member 94, which in turn, may be secured within the beam structure 40 of the first blade segment 30 adjacent to the second section 84 of the pin portion 80.

Figure 19:
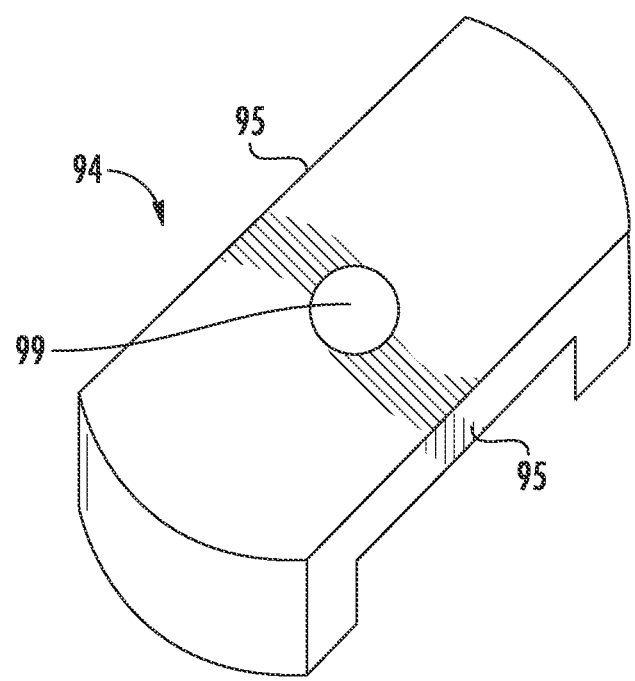
FIG. 19 illustrates a perspective view of one embodiment of a flange member of a proximal portion of the span-wise extending pin according to the present disclosure.

In further embodiments, the flange member 94 may be sized to fit through the pin joint slot 56. For example, as shown in FIG. 17, the flange member 94 may have a cap shape with trimmed corners 95 to assist in assembling the flange member 94 through pin joint slot 56. In addition, as shown, the flange member 94 may include one or more cut-outs 97 for providing improved torqueing capability of the rod member 92 during assembly. FIG. 19 illustrates a perspective view of yet another embodiment of the flange member 94 having trimmed corners 95 and a threaded bore 99 for receiving the rod member 92. Still any other suitable shapes may be utilized for the flange member 94.

Figure 20A:
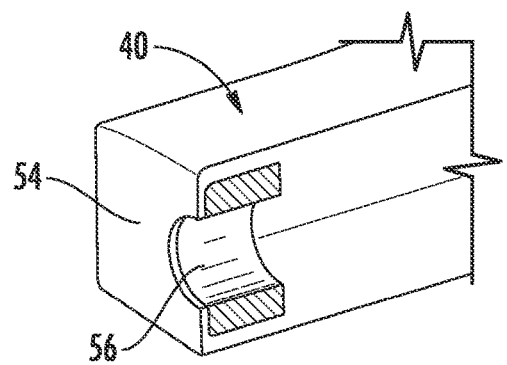
FIG. 20A-20G illustrate a process flow diagram of one embodiment of assembling the span-wise extending pin into the receiving end of the beam structure of the first blade segment according to the present disclosure.
Figure 20B:
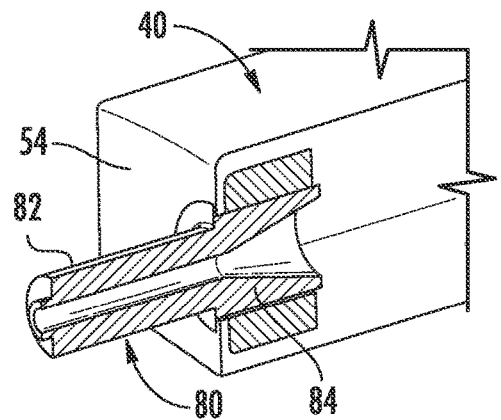
Figure 20C:
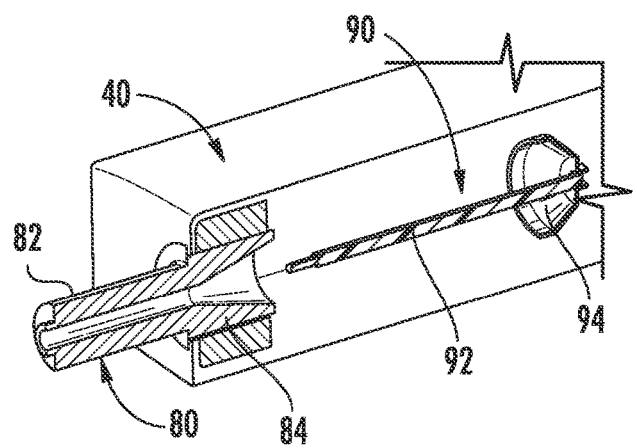
Figure 20D:
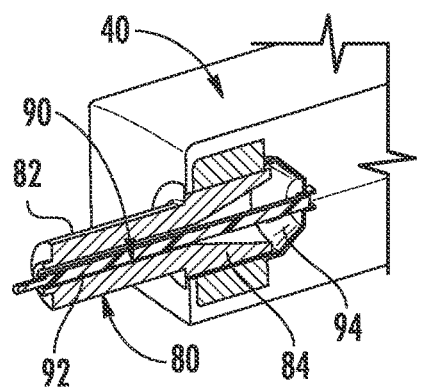
Figure 20E:
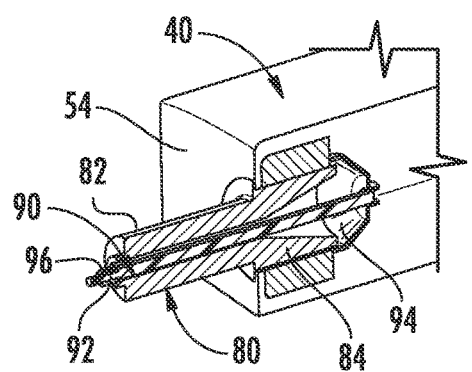
Figure 20F:
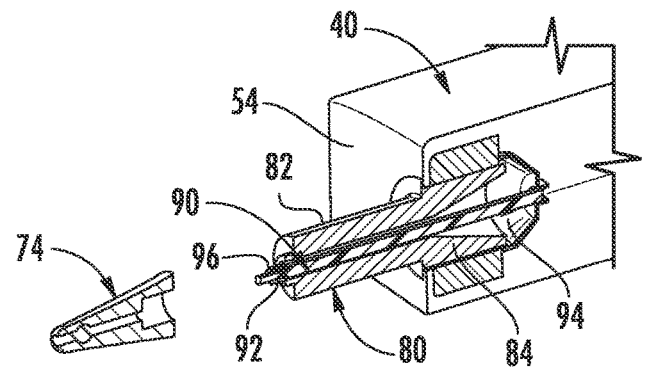
Figure 20G:
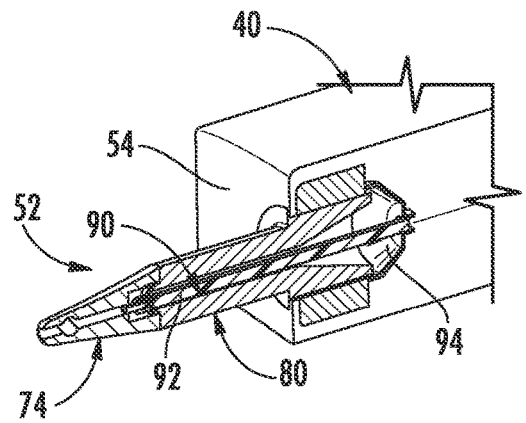

Referring now to FIG. 20A-20G, a process flow diagram of one embodiment of assembling the span-wise extending pin 52 into the receiving end 54 of the beam structure 40 of the first blade segment 30 is illustrated. As shown in FIG. 20A, the pin joint slot 56 is drilled into the receiving end 54 of the beam structure 40. After drilling the pin joint slot, the proximal portion 90 of the span-wise extending pin 52 can be inserted into the pin joint slot 56. As shown in FIG. 20B, the pin portion 80 of the span-wise extending pin 52 is inserted into the pin joint slot 56 such that the first section 82 of the pin portion 80 extends from the receiving end 54 of the beam structure 40 and the second section 84 of the pin portion 80 fits within the pin joint slot 56, e.g. either through a press-fit, shrink fit, adhesion, or threaded connection. As shown in FIG. 20C, the rod member 92 of the proximal portion 90 is maneuvered towards the pin portion 80. As shown in FIG. 20D, the rod member 92 of the proximal portion 90 is inserted through the pin portion 80 until the flange member 94 abuts against the second section 84 of the pin portion 80. As shown in FIG. 20E, one or more fasteners 96 are secured around the rod member 92 of the proximal portion 90 so as to secure the rod member 92 through the pin portion 80. As shown in FIG. 20F, the distal portion 74 is aligned with the first section 82 of the pin portion 80. As shown in FIG. 20G, the distal portion 74 is secured to the first section 82 of the pin portion 80.

Figure 21:
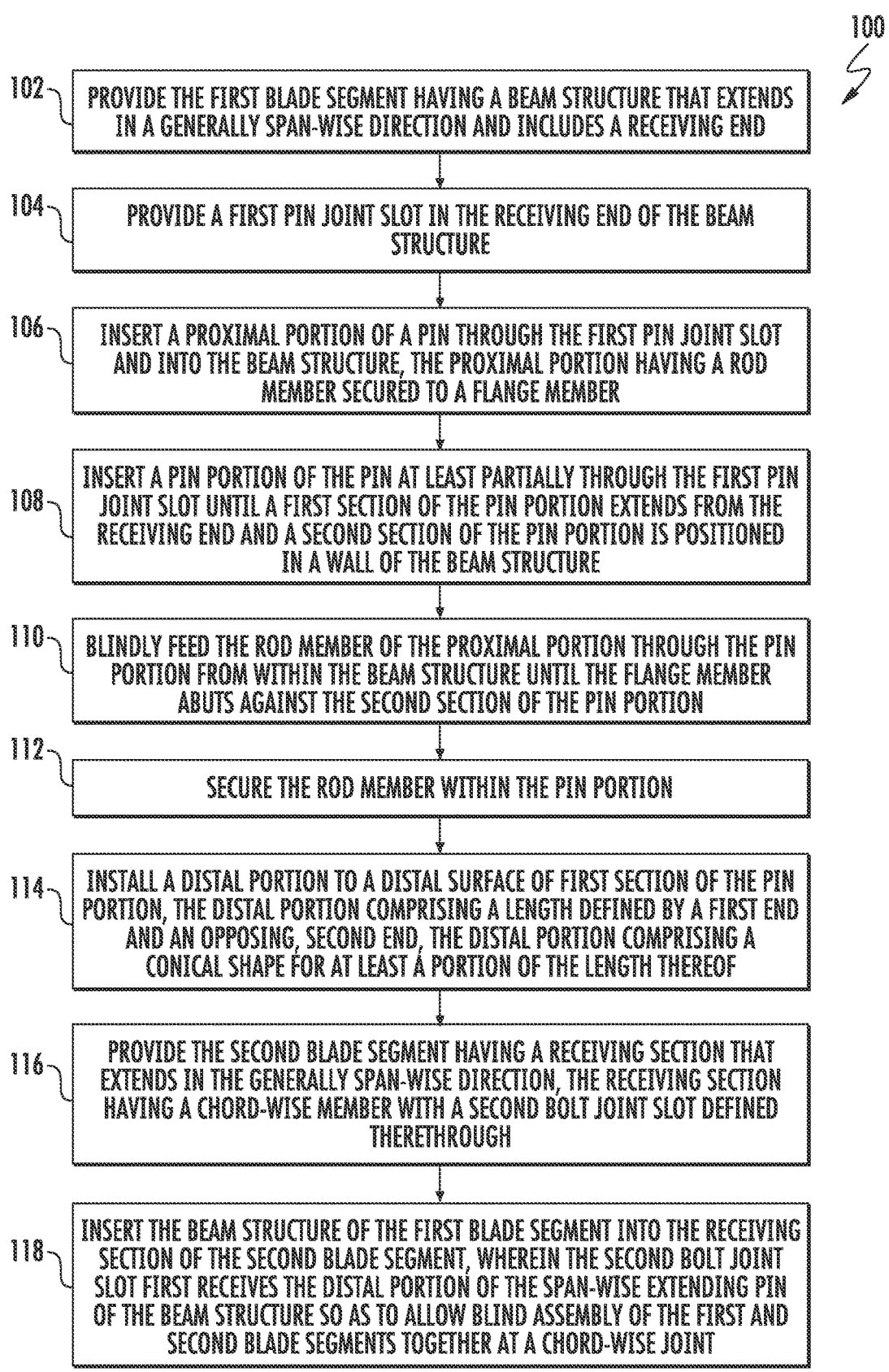
FIG. 21 illustrates a flow chart of one embodiment of a method of joining first and second blade segments of a rotor blade of a wind turbine according to the present disclosure.

Referring now to FIG. 21, a flow chart 100 of a method of joining first and second blade segments of a rotor blade of a wind turbine according to the present disclosure is illustrated. In general, the method 100 will be described herein with reference to the wind turbine 10 and the rotor blade 28 shown in FIGS. 1-20. However, it should be appreciated that the disclosed method 100 may be implemented with rotor blades having any other suitable configurations. In addition, although FIG. 21 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (102), the method 100 may include providing the first blade segment 30 having the beam structure 40 that extends in a generally span-wise direction and includes a receiving end 54. As shown at (104), the method 100 may include providing a first pin joint slot 56 in the receiving end 54 of the beam structure 40. As shown at (106), the method 100 may include inserting the proximal portion 90 of the span-wise extending pin 52 through the first pin joint slot 56 and into the beam structure 40. As shown at (108), the method 100 may include inserting the pin portion 80 of the pin 52 at least partially through the first pin joint slot 56 until the first section 82 of the pin portion 80 extends from the receiving end 54 of the beam structure 40 and the second section 84 of the pin portion 80 is positioned in a wall of the beam structure 40. As shown at (110), the method 100 may include blindly feeding the rod member 92 of the proximal portion 90 through the pin portion 80 from within the beam structure 40 (i.e. without a visual) until the flange member 94 abuts against the second section 84 of the pin portion 80. As shown at (112), the method 100 may include securing the rod member 92 within the pin portion 80. As shown at (114), the method 100 may include installing the distal portion 74 to a distal surface of first section 82 of the pin portion 80. As shown at (116), the method 100 may include providing the second blade segment 32 having the receiving section 60 that extends in the generally span-wise direction. As shown at (118), the method 100 may include inserting the beam structure 40 of the first blade segment 30 into the receiving section 60 of the second blade segment 32. As such, the second pin joint slot 56 first receives the distal portion 74 of the span-wise extending pin 52 of the beam structure 40 so as to allow blind assembly of the first and second blade segments 30, 32 together at the chord-wise joint 34.

The skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade for a wind turbine, comprising:
a first blade segment and a second blade segment extending in opposite directions from a chord-wise joint, each of the first and second blade segments comprising at least one shell member defining an airfoil surface, the first blade segment comprising a beam structure having a receiving end, the second blade segment comprising a receiving section that receives the beam structure of the first blade segment, the receiving section comprising a chord-wise member having a pin joint slot defined therethrough; and,
at least one span-wise extending pin extending from the receiving end of the beam structure and into the pin joint slot so as to secure the first and second blade segments together, the span-wise extending pin comprising:
a distal portion comprising a length defined by a first end and an opposing, second end, the distal portion comprising a conical shape extending for at least a portion of the length thereof for providing ease of insertion of the span-wise extending pin into the pin joint slot;
a pin portion adjacent to the distal portion, the pin portion having a first section and a second section, the second section secured within the beam structure, the first section extending span-wise from the receiving end of the beam structure; and,
a proximal portion comprising at least a rod member that extends span-wise through and secures together the pin portion and the distal portion.

2. The rotor blade of claim 1, wherein the distal portion further comprises at least one through hole for providing improved torqueing capability.

3. The rotor blade of claim 1, wherein the conical shape extends the length of the distal portion from the first end to the second end.

4. The rotor blade of claim 1, wherein the conical shape extends from the first end to an intermediate location of the distal portion before the second end, the distal portion further comprising an extended, uniform body section adjacent to the conical shape.

5. The rotor blade of claim 1, further comprising a radial flange positioned between the first and second sections of the pin portion, the radial flange abutting against the receiving end of the beam structure.

6. The rotor blade of claim 1, wherein the first section of the pin portion comprises a first diameter and the second section comprises a larger, second diameter.

7. The rotor blade of claim 1, wherein the pin portion further comprises a protruding feature at a distal end thereof for receiving the distal portion thereon.

8. The rotor blade of claim 1, wherein the pin portion further comprises an internal tapered opening at a distal end or a proximal end thereof for receiving the rod member.

9. The rotor blade of claim 1, wherein at least a portion of an internal wall of the first section and/or second section of the pin portion is hollowed out.

10. The rotor blade of claim 1, wherein the proximal portion further comprises a flange member secured within the beam structure of the first blade segment adjacent to the second section of the pin portion via the rod member, wherein the rod member is threaded and secured within the pin portion and the distal portion via one or more fasteners.

11. The rotor blade of claim 10, wherein the flange member is sized to fit through the pin joint slot, the flange member further comprising one or more cut-outs for providing improved torqueing capability of the rod member.

12. The rotor blade of claim 1, further comprising a retention assembly for retaining the span-wise extending pin within the pin joint slot, the retention assembly comprising at least one of a bearing assembly, a bushing assembly, a threaded connection, an adhesive, or a press-fit.

13. A pin for joining first and second blade segments of a rotor blade of a wind turbine, the pin comprising:
- a distal portion comprising a length defined by a first end and an opposing, second end, the distal portion comprising a conical shape extending for at least a portion of the length thereof for providing ease of insertion of the pin into a pin joint slot of one of the first and second blade segments;
- a pin portion adjacent to the distal portion, the pin portion having a first section and a second section, the second section configured for securing within a beam structure of the first blade segment, the first section extending span-wise from a receiving end of the beam structure; and,
- a proximal portion comprising at least a rod member that extends span-wise through and secures together the pin portion and the distal portion.

* * * * *